United States Patent

[11] 3,624,636

[72] Inventor Marie Alphonse Paul Eugene Pierre Diederich
London, England

[21] Appl. No. 18,566
[22] Filed Mar. 11, 1970
[45] Patented Nov. 30, 1971
[73] Assignee Decca Limited
London, England

[54] DIGITIZERS FOR SINE AND COSINE ANALOGUE SIGNALS
16 Claims, 3 Drawing Figs.

[52] U.S. Cl. .......... 340/347 AD, 235/183, 235/197, 328/14, 328/127, 328/142, 340/347 NT
[51] Int. Cl. .......... G06g 7/22, H03k 13/20
[50] Field of Search .......... 235/150.53, 183, 186, 189, 197; 328/14, 127, 142, 187; 330/110; 331/38, 40; 340/347 AD, 347 SH

[56] References Cited

UNITED STATES PATENTS

| | | | |
|---|---|---|---|
| 3,438,026 | 4/1969 | Prill et al. .......... | 340/347 |
| 3,371,199 | 2/1968 | Schwartzenberg et al. .... | 235/189 |
| 3,296,613 | 1/1967 | Andersen et al. .......... | 340/347 |
| 3,421,093 | 1/1969 | Hinrichs et al. .......... | 340/347 |
| 3,518,557 | 6/1970 | Harmuth et al. .......... | 328/127 X |

*Primary Examiner*—Eugene G. Botz
*Assistant Examiner*—Jerry Smith
*Attorney*—Mawhinney & Mawhinney

ABSTRACT: A digitizer for analogue signals representing the sine and cosine of an angle. The digitizer includes two integrating amplifiers and an inverter in a series closed loop. The amplifiers have inputs for receiving the analogue signals. A digital counter is fed with clock pulses while the rotor circuit oscillates from an initial phase determined by the analogue voltages to a datum phase. The number counted by the counter is representative of the said angle. Before such a digitizing operation, reference voltages are set into the rotor circuit which executes a test cycle. According to whether the counter is partially full or has overflowed during the test cycle the frequency of the clock pulses is varied in preparation for a digitizing operation. Bistable arrangements controlling switches alternately operative to allow the rotor circuit to oscillate and allow the application of analogue signals to the inputs of the amplifiers are also provided.

DIGITIZERS FOR SINE AND COSINE ANALOGUE SIGNALS

BACKGROUND OF THE INVENTION

This invention relates to digitizers for analogue signals representing the sine and cosine of an angle.

It is known to form an electrical analogue of a rotating shaft by, for example, disposing two high-gain integrating amplifiers in series with an inverter to form a closed loop. With such an arrangement the voltage outputs at the amplifiers are at levels V sine $\alpha$ and V cosine $\alpha$ where $\alpha$ can be regarded as the angle that a phasor of length V rotating about the origin of a cartesian coordinate two-dimensional system makes with the X-axis of the system. The projections of the phasor on the X- and Y-axes are given as V cosine $\alpha$ and V sine $\alpha$ respectively. Such a "rotor circuit" may be "set" by applying to appropriate points in the circuit, such as the inputs of the amplifiers, two electrical voltages proportional respectively to the sine and cosine of an angle. The rotor circuit then subsequently oscillates starting from a phase corresponding to that angle.

It should be remarked that a rotor circuit need not comprise two "integrators" in series with an inverter and the expression "rotor circuit" in this specification is intended to refer generally to the type of circuits which are electrical analogues of a rotating shaft or phasor and which can be set by applying to appropriate points (hereinafter called phase determining inputs) in the circuit two electrical signals, representing in magnitude and sign the sine and cosine of an angle respectively such that the subsequent oscillation of the rotor circuit has an initial phase corresponding to the said angle.

For a number of purposes it is desirable to convert two analogue voltages representing respectively in magnitude and sign the sine and cosine of an angle ($\alpha$) into a digital signal which is representative of an angle. The main object of the present invention is to provide improved apparatus for this purpose.

SUMMARY OF THE INVENTION

In the present invention the conversion of the analogue signals to a digital signal representative of the angle is achieved by applying the analogue voltages to "set" the rotor circuit and, while the rotor circuit is oscillating from its initial phase to a datum phase, counting regular "clock" pulses by means of a suitable counter. With this apparatus the number of pulses counted between the times when the rotor circuit is set to oscillate and when it achieves the datum phase is digitally representative of the angle $\alpha$. It should be explained that the number counted may represent directly the angle but might also represent its true complement (that is to say $2\pi-\alpha$), or $\alpha$ less a fixed quantity, depending on the sense of the oscillation of the rotor circuit and the particular phase of the oscillation of the rotor circuit that is selected as the datum phase.

However, the digitization of the analogue signals in this fashion requires that the frequency of the clock pulses and the frequency with which the rotor circuit oscillates be in a fixed relationship. The accuracy of the digitization is among other things determined by the stability of this relationship. Even if a stable crystal oscillator were used to produce the clock pulses the accuracy of the system may suffer owing to relatively poor stability to the rotor circuit. The rotor circuit normally includes high-gain amplifiers and various passive components such as capacitors whose values critically determined the frequency of oscillation. Accordingly, to provide a highly stable oscillator for the clock pulses does not by itself guarantee accurate digitization. Thus, a further object of the invention is the achievement of accurate control of the relationship between the frequency of the clock pulses and the oscillation of the rotor.

Accordingly a preferred feature of the invention includes a variable frequency pulse generator for providing the clock pulses and control means for maintaining substantially constant a predetermined relationship between the frequency of the clock pulses and the frequency of oscillation of the rotor circuit. Said control means for maintaining preferably is constituted by a servomechanism for controlling the frequency of the clock pulses, said servomechanism being operative to overcome the effects of temperature or other environmental changes to respond to a change in the oscillation frequency of the rotor circuit to change the frequency of the clock pulses accordingly.

For this purpose, it is convenient to provide means for setting the rotor circuit to oscillate from an initial reference phase by applying to it two reference analogue signals respectively representing in magnitude and sign the sine and cosine of the reference phase, means for detecting the attainment of a subsequent reference phase in the oscillation of the rotor circuit and means, associated with the means for detecting, for increasing or decreasing the frequency of the pulse generator according to whether the number of pulses produced by the generator in the period between the initial reference phase and the subsequent reference phase is smaller or greater than a predetermined value. Conveniently the means for detecting comprises the aforementioned detector. Conveniently also a cyclically operative counter, which may be a binary counter and may be the aforementioned counter, is used for determining the number of pulses produced between the initial reference phase and the subsequent reference phase of the oscillation.

With this form of the invention it is envisaged that a digitization of two analogue signals shall be preceded by an operation checking the relationship between the frequencies of the generator and the oscillation of the rotor circuit. Two analogue reference signals are applied to the rotor circuit and in accord with the count obtained when the subsequent reference phase is achieved (which subsequent reference phase is conveniently the datum phase) the frequency of the pulse generator is adjusted to correct any error in the relationship. Subsequently the actual digitization of the two first-mentioned analogue signals can be made.

The digitizer may include a bistable arrangement which in one state operates gate means allowing the oscillation of the rotor circuit and in its other state operates further gate means allowing the analogue signals to be applied to the rotor circuit, means responsive to the attainment of a predetermined count by the counter being arranged to change the bistable arrangement alternately between its two states. This feature is extremely useful in practice. It will be appreciated that the application of analogue voltages to the rotor circuit does not instantaneously ensure that the rotor circuit will start to oscillate from the associated initial phase. The charging of capacitors and other processes which take a finite time require that the set-in conditions should settle down before the rotor circuit is permitted to oscillate. Furthermore, it is most desirable that the counter should start each count, whether for the purpose of testing the digitizer or for actually digitizing, from a reference count which is conveniently when the counter is "-full." It will be appreciated that a binary counter operates cyclically so that after the "full" condition it then commences counting again. With the present feature of the invention the count is always started in the same numerical position of the counter and the rotor loop is prevented from oscillating while analogue voltages are being applied to set it. This enables the initial conditions to settle down properly.

The means for applying the analogue voltages to the rotor circuit may comprise simultaneously operable switching means for applying the signals through an input resistor and for simultaneously closing a resistive feedback circuit for each of two operational amplifiers in the rotor circuit. The simultaneously operable switching means would be operable in response to the occurrence of one state of the bistable arrangement. A further switch or simultaneously operable switches for making and breaking the series connection of the rotor circuit may be operable in response to the occurrence of the other state of the bistable arrangement. It will be appreciated that the entire switching means just described can be regarded as the aforementioned means for setting the rotor circuit to oscillate; it is merely convenient that the setting of the rotor circuit should consist of a plurality of successive operations.

In practice it is convenient that the rotor circuit comprises two operational amplifiers, arranged as integrators, in series with an inverter, although other arrangements exhibiting an analogue of a rotating shaft are regarded as equivalent.

The aforementioned detector may comprise a zero-crossing detector coupled to the output of an operational amplifier in the rotor circuit (conveniently one of the integrators if there is one) and arranged to provide a signal indicative of the passage through zero potential of the output signal from that amplifier. This is merely convenient and it is obviously equivalent to detect some other predetermined voltage level.

BRIEF DESCRIPTION OF THE DRAWINGS

The accompanying drawings illustrate various parts of a digitizer constructed in accord with the invention. In particular.

DESCRIPTION OF THE PREFERRED EMBODIMENTS

Figure 1:
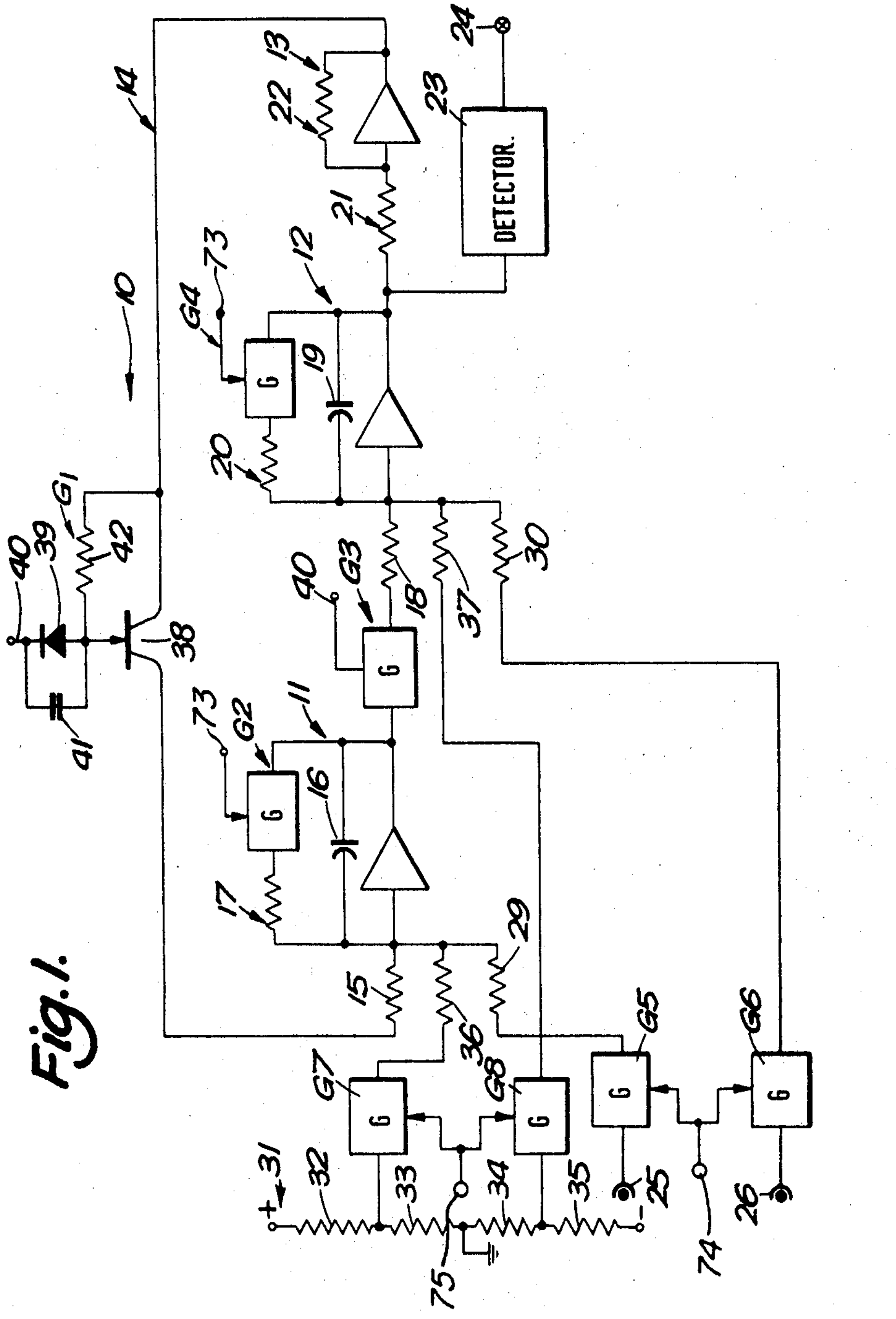
FIG. 1 is a schematic diagram of a rotor circuit and various associated control arrangements constructed in accord with the invention.

In FIG. 1 there is shown a rotor circuit 10 comprising two high-gain amplifiers 11 and 12 arranged in series with an inverter 13, the output of the inverter being coupled via a feedback line 14 through a gate G1 to an input resistor 15 for the amplifier 11. The amplifier 11 has a feedback capacitor 16 and an additional resistive feedback circuit consisting of a resistor 17 in series with a gate G2. The output of the amplifier 11 feeds, via a further gate G3, an input resistor 18 for the amplifier 12, which has a feedback capacitor 19 and an additional resistive feedback circuit consisting of a resistor 20 and a gate G4. The output of the amplifier 12 leads to an input resistor 21 for the inverter 13 which has a feedback resistor 22 of the same value as the resistor 21 so that the gain of the inverter is unity and negative. In fact the gain can be nonunity but it is convenient to render it unity.

Coupled to the output of the amplifier 12 is a zero crossing detector 23 which provides a unit output at a terminal 24 when the voltage at the output of the amplifier 12 passes through zero in a negative going direction. This condition corresponds to the aforementioned datum phase and the subsequent reference phase which in this embodiment of the invention are the same. The zero crossing detector corresponds to the aforementioned detector which in this embodiment is synonymous with the aforementioned means for detecting.

Two analogue electrical signals representing respectively in magnitude and sign the sine and cosine of an angle are available at two input terminals 25 and 26. The input terminals lead through respective gates G5 and G6 to input resistors 29 and 30 for the respective amplifiers 11 and 12.

Also shown in FIG. 1 is a double potential divider arrangement 31 comprising four resistors 32, 33 34 and 35. The junction of the inner two resistors 33 and 34 is earthed while the outer ends of the resistors 32 and 35 are coupled to sources of positive and negative potential respectively.

The junctions between the resistors 32 and 33 and 34 and 35 respectively are coupled through respective gates G7 and G8 input resistors 36 and 37 for the two amplifiers 11 and 12; the resistors 32 and 35 and the associated input and feedback resistors and proportioned so that the required reference voltages are set into the rotor circuit (at appropriate times).

It is convenient to mention at this point that the rotor circuit is arranged so that the instantaneous angle of the corresponding rotating phasor decreases with time. Thus because it is convenient to test the relationship between the clock frequency and the oscillation frequency using as large a period in the phase of the oscillation as possible, the reference analogue signals are chosen so that the initial reference phase is as close to $2\pi$ as possible.

It is also convenient to mention at this point that the gates G1 and G3 are simultaneously operable as are the pairs G2 and G4; G5 and G6; and G7 and G8. It will further be appreciated that when the gates G1 and G3 are closed the gates G2 and G4 and/or the other gates shown in FIG. 1 are also open. On the other hand, if the gates G5 and G6 or the gates G7 and G8 are open then so are the gates G2 and G4 so that the respective analogue voltages can be applied to set the rotor circuit whereas the closing of the gates G1 and G3 prevents the oscillation of the rotor loop.

It is finally convenient to mention with reference to FIG. 1 that all the gates shown are of a form which for convenience has only been shown in detail with reference to the gate G1. This gate comprises a field effect transistor 38 of which the control electrode is coupled through a diode 39 to a control input 40, a capacitor 41 being coupled in parallel across the diode and a high-value resistor 42 being coupled in parallel from the control electrode of the transistor to the line 14.

Figure 2:
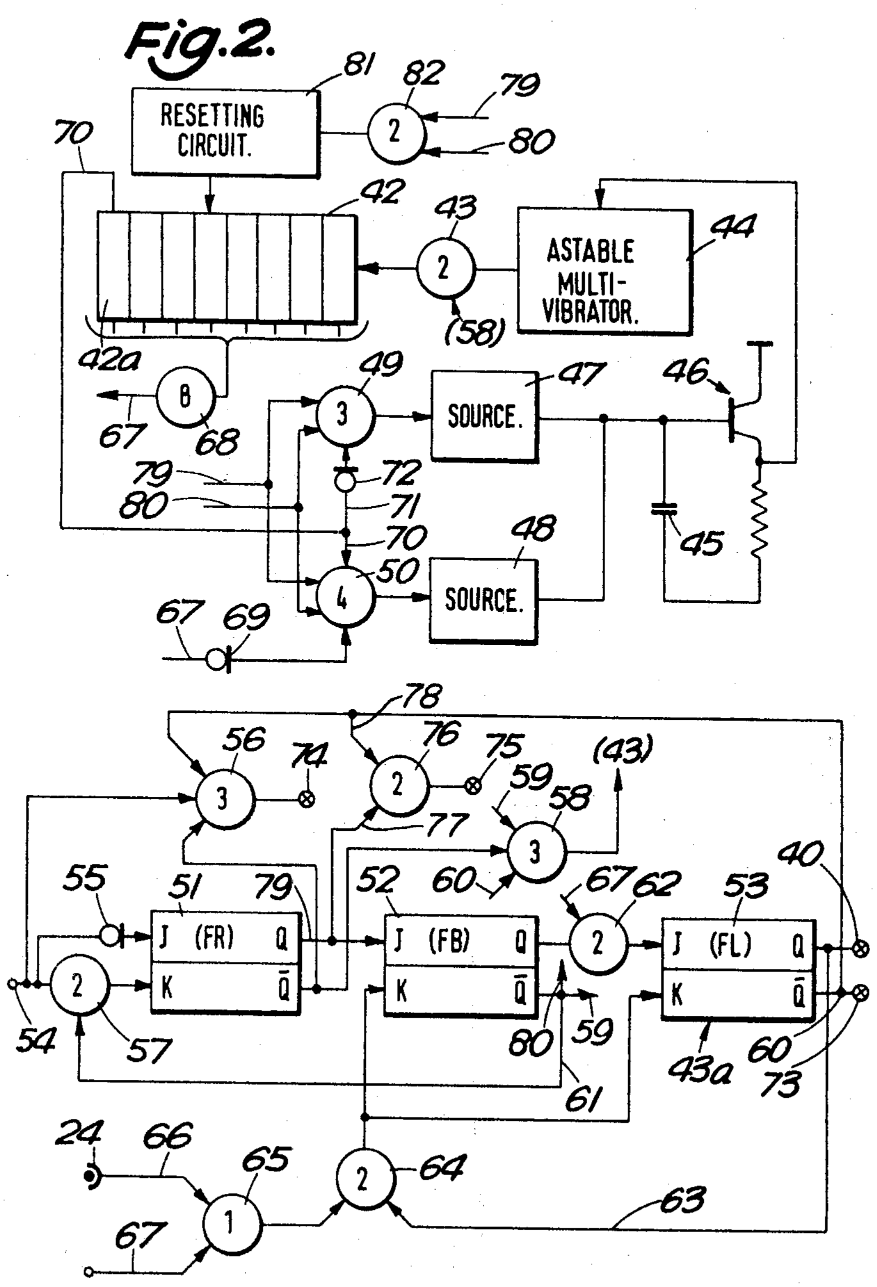
FIG. 2 is a schematic diagram of a counter and the control circuits for the digitizer.
Figure 3:
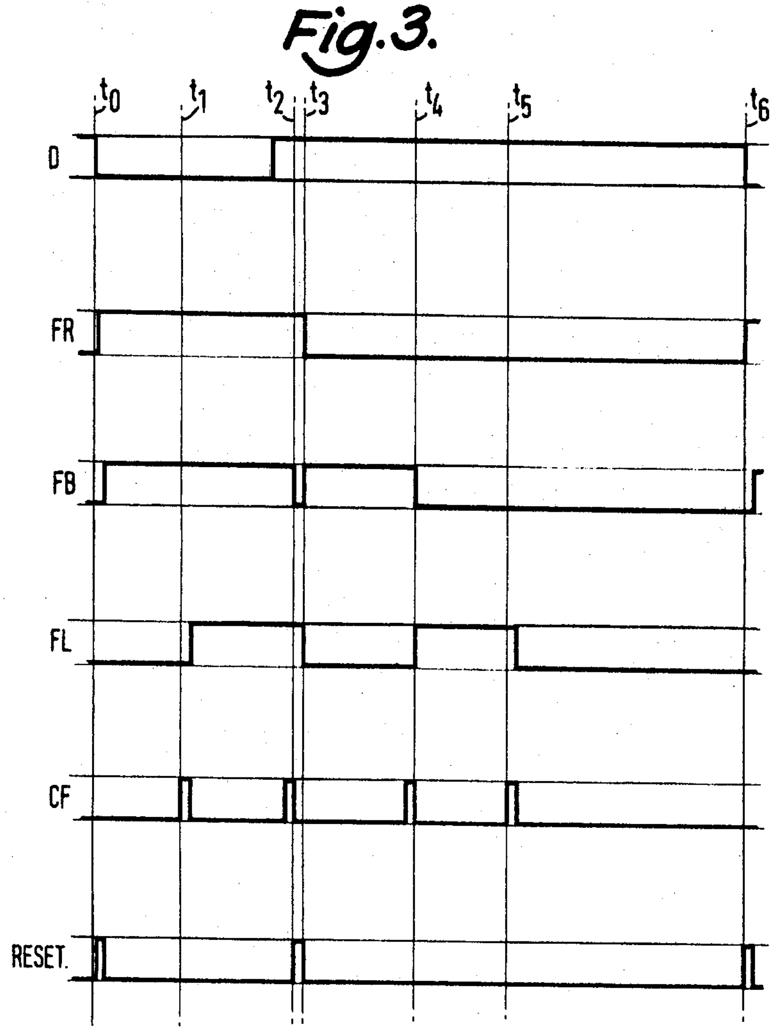
FIG. 3 is a timing diagram.

Reference will now be made to FIGS. 2 and 3 to explain the remainder of the apparatus constituting the digitizer and to explain the manner of operation of the digitizer.

In FIG. 2 there is shown a digital counter 42 which is an eight stage binary counter. For feeding clock pulses into the counter through a gate 43 there is provided an astable, voltage controlled, multivibrator 44. The astable multivibrator produces clock pulses at a frequency which is determined by the charge on a capacitor 45 in a "sample and hold" circuit 46. For increasing the charge on the capacitor is provided an extraction current source 47 and for decreasing the charge on the capacitor there is provided an injection current source 48. The sources 47 and 48 are rendered operative selectively by two gates 49 and 50: how these operate will be explained later.

The operation of the system of FIG. 2 is principally controlled by three bistable circuits 51, 52 and 53. These circuits, which are in the form known as "JK" bistables, have "set" states which will be called hereinafter FR, FB and FL. For the sake of clarity, it is appropriate to remark that a JK bistable is set when its inputs are (1,0); reset when they are (0,1); changed (whether set or reset) when they are (1,1). In order to render more comprehensible the description that follows, it may be remarked that the state FR is associated with a reference cycle; FB with the busy state of the system; FL with oscillation of the rotor circuit; and FB and $\overline{FL}$ together with the feeding of the various voltages to set the rotor circuit ready for oscillation.

The existence of a demand that an angle represented by two analogue voltages should be digitized is denoted by the presence of "1" (unity) signal (called D) at an input 54. The inverse ($\overline{D}$) of the demand signal is obtained by means of an inverter 55 and is fed to the J input of the first bistable 51. The demand signal itself is fed to one input of an AND-gate 56 and to one input of a two-input AND-gate 57 of which the output leads to the K input of the first bistable 51.

The direct, or 'Q,' output of the first bistable 51 leads to the J input of the second bistable 52; the inverse ($\overline{Q}$) output leads to one input of a three input NAND-gate 58 of which the output leads to the second input of the gate 43. The gate 43 coupling the vibrator clock pulse source to the counter must be open when the rotor circuit is executing an oscillation and also when the counter is being filled prior to an oscillation. Thus the output of the gate 58 must be unity when $\overline{FR}$ or $\overline{FB}$ or $\overline{FL}$ are unity (FR or FB or FL being zero). The inverse output of the second bistable 52 leads via a line 59 to a second input of the NAND-gate 58. The third input of the gate 58 is fed via a line 60 from the inverse output of the third bistable 53. Finally the inverse output of the second bistable 52 leads via a line 61 to a second input of the AND-gate 57.

The direct (Q) output of the second bistable 52 leads to the J input of the third bistable 53 through a two-input AND-gate 62. The direct output of the third bistable 53 leads via a line 63 to one input of a two-input AND-gate 64 of which the output leads to the K inputs of both the bistable 52 and the bistable 53. The other input of the gate 64 is fed by the output of an OR-gate 65 of which the two input lines 66 and 67 are coupled respectively to the output 24 of the detector 23 (see FIG. 1) and the output of an eight-input AND-gate 68 which is coupled to the eight states of the counter 42 and provides a unity output signal (CF) when the state of the counter is "full." The line 67 leads also to the second input of the AND-gate 62 and through an inverter 69 to one of the four input AND-gate 50.

The most significant stage 42a of the counter 42 provides a representative output ($h$) which is fed via a line 70 to another input of the gate 50 and via a line 71 and an inverter 72 to an input of the gate 49.

At this point it is convenient to explain how the setting of the bistables controls the gates G1 to G8 of FIG. 1. The gates G1 and G3 are opened when the state of the bistable 53 is FL, viz., by a unity signal at their common control terminal 40 which is coupled to the Q output of the bistable 53. The gates G2 and G4 are opened when the state of the bistable 53 is $\overline{FL}$: for this purpose, the $\overline{Q}$ output of the bistable 53 leads to a common control terminal 73 for the gates G2 and G4. The gates G5 and G6 are opened when the demand signal and the states $\overline{FR}$, $\overline{FL}$ are all unity: the common control terminal 74 is fed by a gating system represented by the three-input AND-gate 56 of which the two hitherto unmentioned inputs are coupled to the inverse outputs of the bistable devices 51 and 53. In fact, it is usually appropriate to constitute the gating system by at least two stages of gates and means for amplifying the analogue signals representing cos $\alpha$ and sin $\alpha$; but for simplicity such a system need not and will not be described in detail. Finally, the gates G7 and G8, which open to allow the application of reference analogue signals to the rotor circuit, require for opening the conditions of the first and third bistables to be FR and $\overline{FL}$. Accordingly the common control terminal 75 for the two gates is fed by the output of a two input AND-gate 76 of which the inputs are fed along the lines 77 and 78 from the direct and inverse outputs respectively of the bistables 51 and 53.

The control gates 49 and 50 together receive via the lines 79 and 80 signals from the direct and inverse outputs of the bistables 51 and 52 respectively.

Finally, the third bistable 53 has a control input coupled to an output line 43a from the astable 44: the third bistable 53 can only change state in the presence of a clock pulse.

In order to explain the significance of the structural features of the control circuit illustrated in FIG. 2, reference will now be made to FIG. 3 which is a timing diagram that shows the condition of the three bistables and the demand signal through a cycle of normal operation of the digitizer.

In an initial state with a demand signal present the three bistables 51, 52 and 53 are all reset to the states $\overline{FR}$, $\overline{FB}$ and $\overline{FL}$: the gates 58 and 43 will be closed. At a time $t_0$ the demand signal D ceases. Within one clock pulse later the state of bistable 51 becomes FR; one further clock pulse later the bistable 52 state becomes FB. Clock pulses are fed into the counter until the occurrence of a 'counter full' signal (CF) at a time $t_1$ which indicates that the aforementioned counter (to be described) is full. The state of the third bistable has been $\overline{FL}$, which prevents any oscillation of the rotor loop and allows the gates G2, G4, G7 and G8 (since FR is unity) to open to apply the reference voltages to the rotor circuit 10. At the time $t_1$ the counter is full and the state of the third bistable becomes FL one clock pulse later. The gates G1 and G3 are opened and the gates G2, G4, G7 and G8 are closed: the rotor circuits begins an oscillation from a phase determined by the reference analogue signals.

It will be recalled that if the output frequency of the astable multivibrator is correct, namely $2^8$ pulses per cycle (approximately 600 ms.) of oscillation of the rotor loop, then neither source 47 or 46 is operated at the end of a reference cycle. The reference analogue signals are chosen so that $\beta$the initial reference phase, is $2\pi(2^8-1)0/2^8$; since the count always starts from zero, the count at the end ($t_2$) of the reference phase should be $2^8-1$), namely 11111111.

The signals applied to the gates 49 and 50 represent unity values $\overline{FB}$ and FR for both sets of signals (these states defining the part of the operating cycle at the end of a reference cycle when a valid comparison of the count can be made) and, respectively, $\overline{h}$ and $h$, $\overline{CF}$, where $h$ is the most significant digit held in the counter. The state $\overline{FB}$ occurs when the detector 23 provides an output.

If the output frequency is too high, then the counter 42 will have overflowed and the most significant digit (amongst others) will be zero. Thus, $\overline{h}$ is unity and the gate 49 is opened to feed a signal operating the extraction current source 47; the charge on the capacitor is decreased and the output frequency of the multivibrator 44 is decreased. On the other hand, if the output frequency is too low, the most significant digit ($h$) will be unity but the counter will not have been filled by the end of the cycle; the signal representing $\overline{CF}$ (counter not full) in conjunction with that representing $h$ will act on the gate 50 to operate the source 48; the charge on the capacitor is increased.

It should be explained that the 'counter full' condition (11111111) is immediately followed by an empty condition, in which the number held in the counter is 00000000. It is necessary that the rotor loop should start oscillating (at times $t_1$ and $t_4$) when the counter is in the latter condition. The bistable 53 is changed to the FL state one clock pulse after the attainment of the 'counter full' condition, because it cannot change state except during a clock pulse: thus the clock pulse which on receipt by the counter yields the full condition is followed by a further clock pulse which resets the counter to zero and simultaneously causes the switching of the bistable 53.

It will be apparent that the signal to the J input of the second bistable 52 is continuously "1" during the reference cycle but there is no equivalent signal to the third bistable. Thus, after the occurrence of a reset signal from the output from the AND-gate 64, there is immediate reversion to the state FB by the second bistable 52. The state $\overline{FB}$ lasts only for the time during which a comparison of frequency is made and in this way operation of the sources 47 and 48 at other times is prevented. However, the third bistable's state remains $\overline{FL}$.

The end of the reference cycle is denoted by the time $t_2$ in FIG. 3. At this time, if there is no demand for the digitization of an angle another reference cycle is executed.

In the present case; however, it is assumed that a demand exists; the signal D is accordingly present at one input of the AND-gate 57. Accordingly when the end of the reference cycle is reached, and the second bistable 52 is momentarily reset to the state $\overline{FB}$, the first bistable is reset to the state $\overline{FR}$. The gates G5 and G6 are opened to feed the "unknown" analogue voltages to the rotor circuit during the period $t_3$ $t_4$. At the time $t_4$the counter is again full and the signal CF is produced: the third bistable is set to the state FL one clock pulse later. The rotor loop oscillates from the phase determined by the analogue signals. At the time $t_5$ the rotor loop has oscillated through a phase change corresponding to the angle $\alpha$where cos $\alpha$ and sin $\alpha$ are proportional to the analogue voltages. At the time $t_5$the detector 23 provides an output which does not change the state of the second bistable device but does change the state of the third bistable device to $\overline{FL}$. Thereby, the gate 43 between the output of the astable multivibrator and the counter is closed because FR, FB and FL are all zero. The digital signal (N) representative of the angle $\alpha$ is held "frozen" in the counter and may be read out therefrom by any suitable means. The signal N remains "-frozen" (the gate 43 being closed) until, at time $t_6$the demand signal D ceases. Thereupon a further reference cycle is executed by the digitizer.

It is desirable to provide resetting of the counter to the initial (00000000) state at the times $t_0 t_2$ and $t_6$ so that the voltage subsequently applied to the rotor circuit have sufficient time to settle; a resetting circuit 81 controlled by a two input AND-gate 82 coupled to the direct output of the first bistable 51 and inverse output of the second bistable suffices.

It should be mentioned that the temporal relationship of the signals at time $t_2$ can in general differ from that shown because the output of the detector 23 need not be simultaneous with the attainment of the 'counter full' condition.

I claim:

1. A digitizer comprising a rotor circuit having two phase determining inputs, initiating means for initiating oscillation of the rotor circuit, said initiating means including means for applying to said inputs two analogue electrical signals representing respectively in magnitude and sign the sine and cosine of an angle, whereby the initial phase of the said oscillation of the rotor circuit is determined by the said angle: a detector responsive to the attainment by the oscillation of said rotor circuit of a datum phase; a counter; means for feeding clock pulses to the counter; means, responsive to the initiation of the oscillation and the attainment of the datum phase, for determining the beginning and end of a count by the said counter; a variable frequency pulse generator for providing the clock pulses; and control means for maintaining substantially constant a predetermined relationship between the frequency of the clock pulses and the frequency of said oscillation of the rotor circuit.

2. A digitizer as set forth in claim 1 in which said control means comprises means for applying to said inputs two reference analogue signals respectively representing in magnitude and sign the sine and cosine of a reference phase, means for detecting the attainment of a subsequent reference phase in the oscillation of the rotor circuit, means for detecting the number of pulses produced by the said generator in the period between the said initial reference phase and the subsequent reference phase, and means coupled to said means for detecting for increasing and decreasing the frequency of the pulse generator selectively according to whether the said number of pulses is smaller or greater than the predetermined number.

3. A digitizer as set forth in claim 2 further comprising a cyclically operative counter for determining said number of pulses, means for coupling clock pulses to said counter, and condition responsive means coupled to said initiating means and said detector to open and close said coupling means.

4. A digitizer as set forth in claim 3 in which the cyclically operative counter is a binary counter.

5. A digitizer as claimed in claim 3 wherein said detector comprises a zero-crossing detector coupled to a point in said rotor circuit, said zero-crossing detector being operative to provide a signal indicative of the passage through zero potential of said point in said rotor circuit.

6. A digitizer as set forth in claim 2 further comprising first gate means openable to allow said rotor circuit to oscillate, second gate means openable for the passage of said analogue signals, bistable means in controlling relation to said first and second gate means, said bistable means having first and second stable states, said bistable means in said first state being operative to open said first gate means and said bistable means in said second state being operative to open said second gate means.

7. A digitizer as set forth in claim 6 further comprising means for switching said bistable means between said first and second states alternately.

8. A digitizer as set forth in claim 7 in which said first gate means includes at least one gate operable to make and break a series connection of said rotor circuit.

9. A digitizer comprising a rotor circuit including two integrator amplifiers and an inverter connected in series in a closed loop, each integrator amplifier including a summing input junction, a capacitative feedback path and an output; means for applying reference analogue signals representative of the sine and cosine of a predetermined angle respectively to the summing inputs of said amplifiers; a clock pulse source; a cyclically operable counter; means for initiating a test oscillation of said rotor circuit from an initial phase determined by said predetermined angle; means for coupling said clock pulse source to said counter during said test oscillation; means for comparing the contents of said counter with a predetermined count after said test oscillation, means for detecting an excess of said contents over said predetermined count; means coupled to the last-named means and said clock pulse source for decreasing the frequency of said clock pulse source; means for detecting excess of said predetermined count over said contents; means coupled to the last-named means and said clock pulse source for increasing the frequency of said clock pulse source; means for applying two analogue signals representing respectively the sine and cosine of an angle to be digitized respectively to said summing inputs, means conditioning said rotor circuit to execute a second oscillation from a phase determined by said angle to be digitized to a datum, a detector coupled to said rotor circuit for detecting attainment of said datum phase, means for conditioning said means coupled between said clock pulse source and said counter for feeding clock pulses to said counter during said last named oscillation, and condition responsive means, coupled to said detector, for closing said means coupled between said clock pulse source and said counter at the end of said oscillation.

10. A digitizer as set forth in claim 9 wherein said detector includes a zero-crossing detector coupled to one of said outputs.

11. A digitizer as set forth in claim 10 wherein said clock pulse source is a voltage controlled astable multivibrator.

12. A digitizer as set forth in claim 10 further comprising a sample and hold circuit including a capacitor, means coupling said capacitor to said astable multivibrator to determine the clock pulse frequency thereof in accord with the voltage across said capacitor; said means for increasing and said means for decreasing being coupled to said capacitor to increase and decrease respectively the charge of said capacitor.

13. A digitizer as set forth in claim 9 in which the means for conditioning said rotor circuit to execute a second oscillation comprises means responsive to a predetermined state of said counter.

14. A digitizer as set forth in claim 9 in which said means for initiating said test oscillation comprises means responsive to a predetermined state of said counter.

15. A digitizer as set forth in claim 9 in which said means for conditioning said rotor circuit to execute a second oscillation and said means for initiating said test oscillation comprise gate means responsive to a predetermined state of said counter.

16. A digitizer comprising a rotor circuit including two integrator amplifiers coupled in a series loop with an inverter, each integrator amplifier including a summing input junction and a capacitive feedback path; first and second sources of electrical potentials, first gate means including a gate disposed in said loop, second gate means including a gate between said first source and a first one of said junctions and a gate between said second source and a second one of said junctions, said second gate means being simultaneously operable; bistable means having two stable states, said bistable means being operative in a first stable state to close said first gate means and open said second gate means, said bistable means being operative in a second stable state to close said second gate means and open said first gate means; a cyclically operative counter; a source of clock pulses; third gate means between said source of clock pulses and said counter, means responsive to said bistable means in said first state to close said third gate means during said first state and to open said third gate means during said second state; means for switching said bistable means to said second state; detector means coupled to said rotor circuit for determining a datum phase in an oscillation thereof, said detector means having an output means for indicating attainment of said datum phase; and means responsive to said output means for changing said bistable means to said first state.

* * * * *